Sept. 1, 1970  L. H. BROWN  3,526,395
APPARATUS FOR REMOVING METALLIC SLAG FROM
TORCH CUTTING OPERATIONS
Filed June 21, 1967  3 Sheets-Sheet 1

INVENTOR
LAWRENCE H. BROWN

BY
ATTORNEY

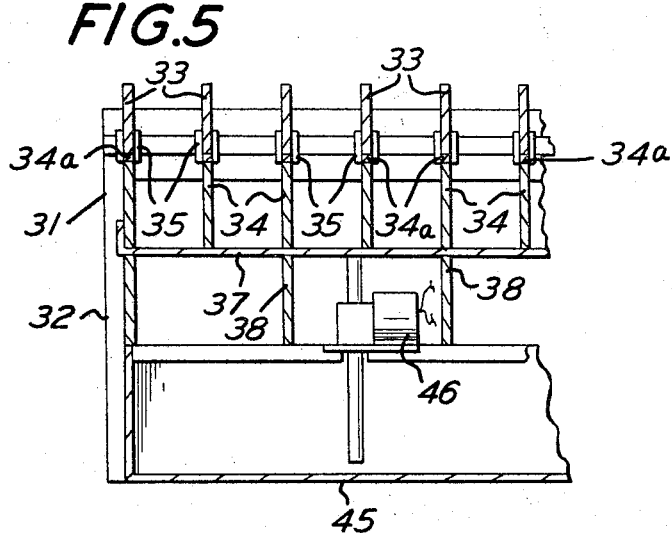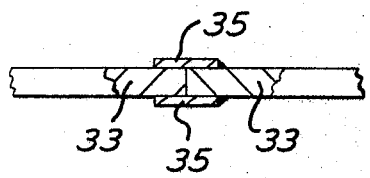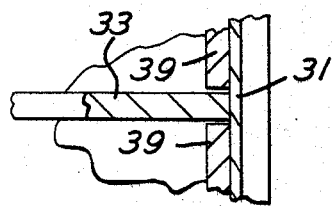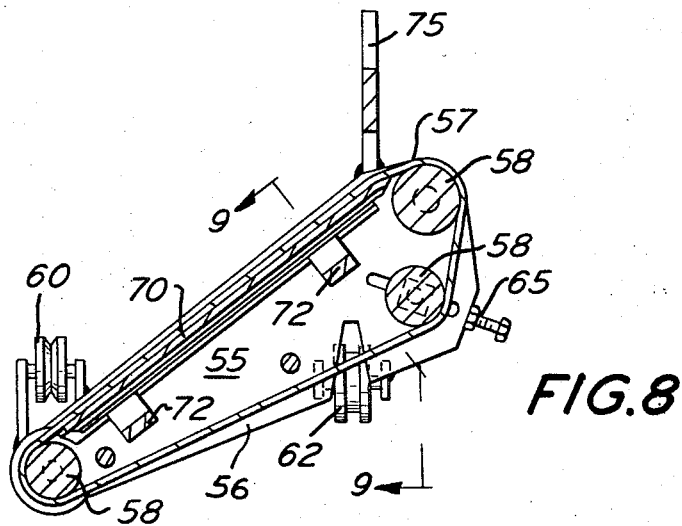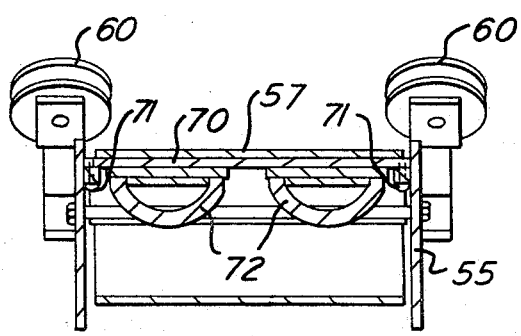

United States Patent Office 3,526,395
Patented Sept. 1, 1970

3,526,395
APPARATUS FOR REMOVING METALLIC SLAG FROM TORCH CUTTING OPERATIONS
Lawrence H. Brown, Prospectville, Pa., assignor to Edgcomb Steel Company, Andalusia, Pa., a corporation of Pennnsylvania
Filed June 21, 1967, Ser. No. 647,859
Int. Cl. F23j 1/00
U.S. Cl. 263—45                                5 Claims

ABSTRACT OF THE DISCLOSURE

An apparatus for removing metallic slag from torch cutting operations on sheets and plates whereby the molten slag is deposited on an inclined metal plate which is washed by a continuous stream of water, the slag being carried down the plate to a conveyor for removal.

BACKGROUND OF THE INVENTION

Field of the invention

This invention is in the field of metal cutting and treating of molten metal from the cutting whereby the metal in molten form is treated, collected and removed.

Description of the prior art

The present methods for removing metallic slag used in conjunction with torch cutting apparatus have many inherent disadvantages. The torch cutting apparatus usually consists of several vertical cutting torches mounted on a movable frame over a plate to be cut with a table supporting the plate and having a slag receiving surface under the plate.

The slag receiving surface is usually a flat metallic plate having a multiplicity of hollow tubes connected thereto and extending vertically therefrom in supporting relationship to the plate to be cut. The molten slag from the cutting operation falls onto the slag receiving plate and in the tubes, adheres to the plate to the tubes and to itself and solidified slag eventually grows to a size where it interferes with the cutting operation and must be removed. The slag can only be removed by chipping which, for the torch cutting apparatus described herein, requires the services of one or two men for approximately 4 to 8 hours depending on size of the table and the quantity of slag which has been collected. The machinery must be shut down for the slag removal which decreases total available production time and increases operating costs. In addition the heat generated by the cutting torches will cause the plate to warp in time which results in finished products that are unsatisfactory and must be reworked.

With the present invention it is not necessary to shut down the torch cutting apparatus for slag removal as the slag is taken away as it forms, and is collected for removal.

SUMMARY OF THE INVENTION

The principal object of the present invention is to provide an apparatus for removing metallic slag from torch cutting operations which do not require shutting down of the cutting apparatus to permit of access to remove the slag.

A further object of the present invention is to provide an apparatus for removing metallic slag from torch cutting operations which result in a simple, inexpensive solution that requires no expensive handling apparatus and results in decreased production costs.

A further object of the present invention is to provide an apparatus for removing metallic slag from torch cutting operations with which a cooling action is obtained, and the dimensional stability of the supporting surface is maintained.

A further object of the present invention is to provide an apparatus for removing metallic slag from torch cutting operations that reduces slag handling and substantially eliminates manual chipping operations, A further object of the present invention is to provide an apparatus for removing metallic slag from torch cutting operations wherein the supports of the piece to be cut are easily and quickly replaced.

A further object of the present invention is to provide an apparatus for removing metal slag from torch cutting operations which prevents access of metal dust and particles to the cutting machine.

A further object of the present invention is to provide an apparatus for removing metal slag from torch cutting operations thereby preventing back pressure on the cutting tips due to metal slag build up.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 3 is a vertical sectional view taken approximately on the line 3—3 of FIG. 1;

FIG. 4 is a fragmentary vertical sectional view taken approximately on the line 4—4 of FIG. 3;

FIG. 5 is a vertical sectional view taken approximately on the line 5—5 of FIG. 3;

FIG. 6 is a horizontal sectional view taken approximately on the line 6—6 of FIG. 3;

FIG. 7 is a horizontal sectional view taken approximately on the line 7—7 of FIG. 3;

FIG. 8 is a vertical sectional view, enlarged taken approximately on the line 8—8 of FIG. 4; and FIG. 9 is a sectional view, taken approximately on the line 9—9 of FIG. 8.

DESCRIPTION OF THE PREFERRED EMBODIMENT

Figure 1:
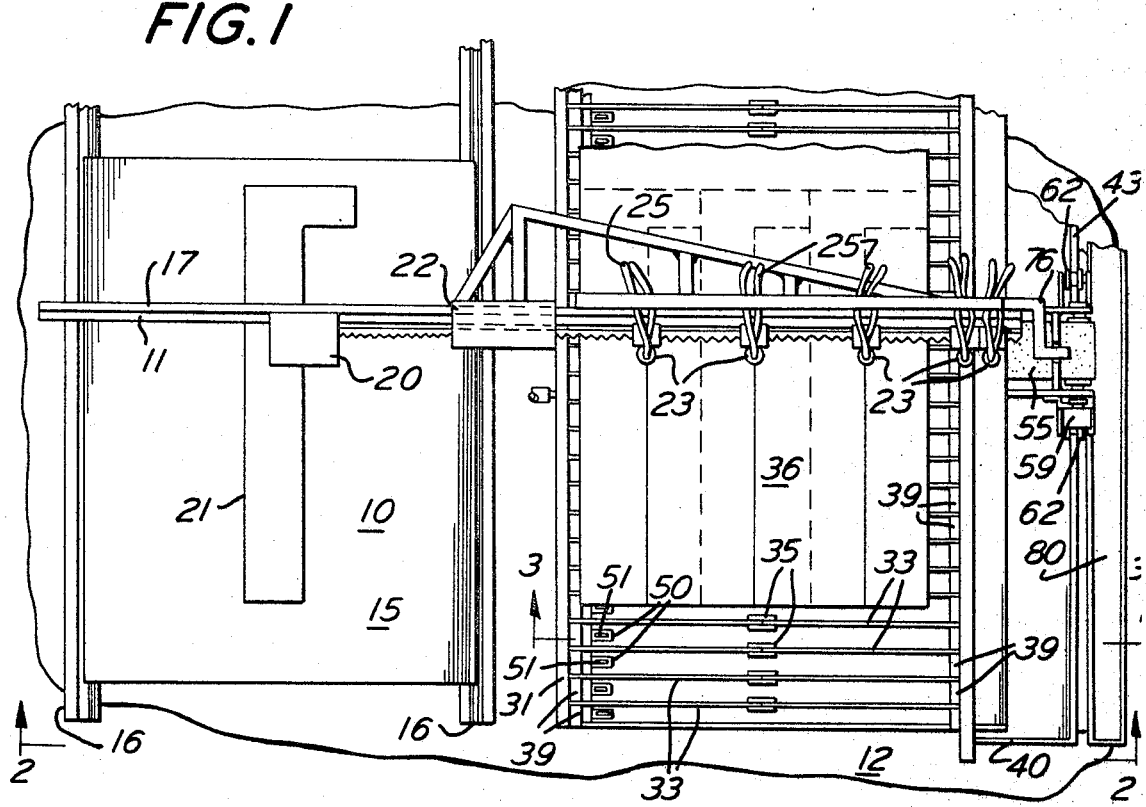
FIG. 1 is a top plan view of a preferred form of apparatus for carrying out the present invention.
Figure 2:
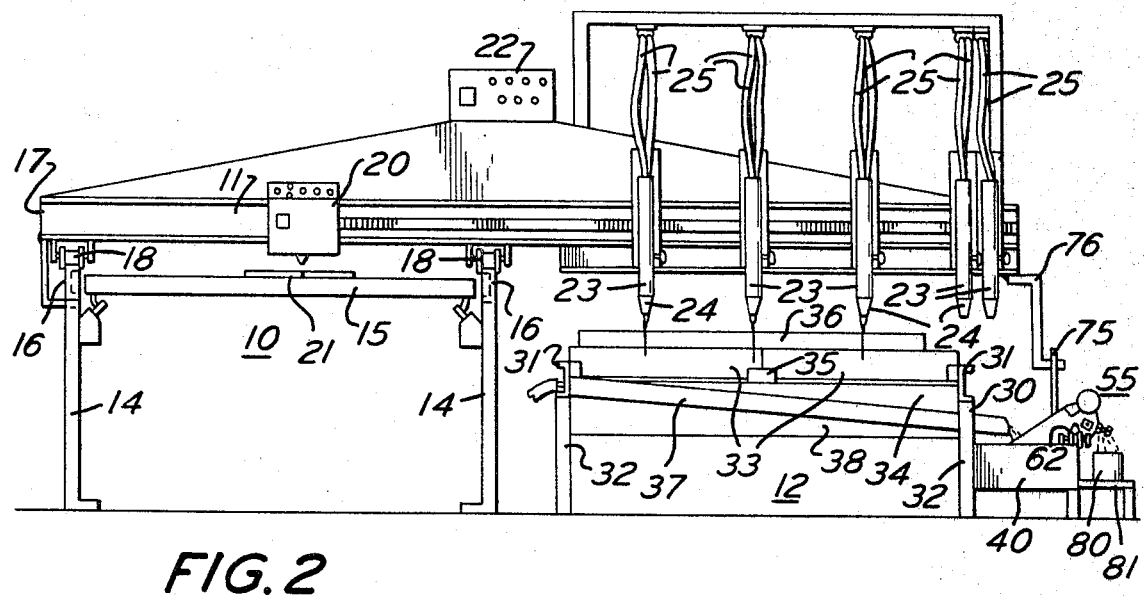
FIG. 2 is a vertical sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, apparatus is shown in conjunction with which the methods and apparatus of the present invention are especially suited and which include a pattern or template supporting table 10 of well known type, an arm 11 mounted on the table 10 and a plate supporting and slag removal portion 12.

The table 10 includes legs 14, top 15 and horizontal channels 16. The arm 11 includes a horizontal bar 17 which is mounted on the channels 16 by a plurality of rollers 18, and is free to move horizontally along the channels 16. A tracing head 20 is provided mounted on the arm 11 over the table 10 and is shown as engaging a pattern 21 on table 10, and has connections to a torch positioning motor 22. A plurality of cutting torches 23 are provided mounted on arm 11, movable horizontally along the arm 11 and with their position controlled by the motor 22 and head 20. The cutting torches 23 are of conventional type with nozzles 24 connected by hoses 25 to a supply (not shown) of suitable combustible gas under pressure. The position of arm 11 on channels 16 is also controlled by the tracing head 20 which is connected to a motor (not shown) and gearing (not shown) which advances or returns the arm 11 along the channels 16. The foregoing apparatus is well known and is described for illustrative purposes.

The plate or workpiece supporting portion 12 includes a frame 30 with top frame members 31 and legs 32. A plurality of thin but deep plate supports 33 are provided supported by upper wedge plates 34 and joined at the center by connector blocks 35, supporting a workpiece 36 which is illustrated as a plate and is to be cut by cutting torches 23. Directly below and supporting the wedge plates 34 an inclined plate 37 is located and as shown more clearly in FIG. 3, the plate 37 is securely fastened to legs 32 at the left, inclined downwardly to the right where it is fastened at its lower end to a pair of the legs 32. In addition the wedge plates 34 are welded to the plate 37 and preferably protected along their upper edges against any cutting action of the torches 23 by interposed strips 34a of suitable material such as stainless steel. The plate supports 33 are guided and retained at their ends by separator members 39 fastened to the frame members 31.

The inclined plate 37 is additionally supported by a plurality of lower wedge plates 38 which are fastened to the plate 37, to the legs 32 and frame 30.

A water collecting tank 40 is provided located at the right of plate 37 and directly under its right hand edge as shown in FIG. 3. The tank 40 is provided with a first overflow lip 41 fastened at top of tank 40 and a second overflow lip 42 which forms a wall of a main water storage and supply tank 45, and an outer vertical wall 43. A supply of water W is provided under plate 37 which is of relatively large volume so as to absorb heat from the slag. The supply of water W is contained in tank 45 which as illustrated in FIG. 3 extends the length and width of the frame 30. The water may have as an additive a nonfoaming lubricating and rust preventing material, the flash point of which is very close to that of water.

A pump 46 of conventional type is mounted at the left of tank 45 with a pipe 47 connected thereto and to a plurality of discharge nozzles 50 which are mounted on one frame member 31 at the left as seen in FIG. 3 so that water may be discharged onto plate 37 between the upper wedge plates 34. The discharge nozzles 50 preferably each has a separate control valve 51 so that discharge of water can be shut off at locations where no cutting is being effected if desired.

A slag removing conveyor 55 is provided and as shown in FIG. 8 is provided with a main frame 56, belt 57, drive mechanism 58 and motor 59. The conveyor 55 is provided with a plurality of rollers 60 at the left as shown in FIG. 8 which rollers 60 are engaged by a trackway 61 fastened to the underside of plate 37 and extending the length therealong. The conveyor 55 is also provided with an additional pair of rollers 62 which are engaged with the top of the outer wall 43 of the tank 40 and free to move therealong. An adjusting screw 65 is engaged with the drive mechanism 58 to place the required tension on the belt 57 to cause proper operation. The conveyor 55 has a removable top plate 70 which is fastened to the frame 56 by screws 71 and which has a plurality of powerful magnets 72 on the undersurface.

The conveyor 55 has a vertical notched arm 75 fastened to the front thereof which is engaged by an extension 76 of arm 11 which moves the conveyor 55 along the wall 63.

A slag collecting container 80 is shown to the right of conveyor 55 and which can be provided with removable baskets (not shown) for collecting of slag from the conveyor 55. The container 80 is supported by a platform 81 fastened to the outer wall 63 of tank 40.

The manner of removing slag will now be pointed out.

A pattern 21 is placed on table 10 and the plate 36 which is to be cut is placed on supports 33. The cutting torches 23 are activated and the pump 46 is activated so that water W from tank 45 is discharged from nozzles 50 onto plate 37, flows down along the plate 37 into tank 40 and spills back over lips 41 and 42 into tank 45 for recirculation.

The motor 59 is activated to move conveyor belt 57 through drive mechanism 58.

The motor (not shown) is activated to move arm 11 along channels 16, and as the arm 11 moves forward or backwards along channels 16, the tracing head 20 will position the cutting torches 23 by means of motor 22 and arm 11 so that the flames from the torches 23 cut out portions of the plate 36 corresponding to the shape of the pattern 21. The molten metal which results from the action of the cutting torches 23 on the plate 36 and supports 33 falls down between and around supports 33 to inclined plate 37 where it contacts the stream of water and is solidified into round pellets. The pellets and fragmentary hollow spherical portions of cooled slag roll or are carried down the plate 37 by the stream of water and fall onto the conveyor belt 57 and are held thereto by the action of the magnets 72. The slag particles remain on the belt 57 until the belt passes over the outside of the conveyor 55 where they are released from the magnetic forces and fall into container 80. The excess water in tank 40 spills back over lips 41 and 42 into tank 45 and can be reused as desired. The cutting operation can continue until the job is completed, and there will be no necessity for shutting down of the cutting operation for cleaning of the apparatus nor for removal of slag which can be taken from container 80 as desired. The conveyor 55 carried with the arm 11 will always be at the location of cutting and the slag will therefore be consistently delivered to container 80. If desired the supports 33 can be replaced individually as desired and since each one only extends half the width of the table, only those badly cut need be replaced instead of a whole support as in previous cutting apparatus in which the slag is collected and solidified.

It will thus be seen that the metallic slag generated by the cutting falls and is collected below the location of generation in a moving stream of cooling liquid, the slag is advanced with the liquid onto a conveyor 55, magnetically attracted and separated from the liquid which passes into the collecting tank 40 thence to tank 45 for recirculation by the pump 46 in a plurality of streams downwardly along the plate 37.

The collected slag with the water separated therefrom can be readily handled and may be useful as an abrasive or for other purposes.

I claim:

1. Apparatus for removing metallic slag from torch cutting operations on metallic sheet material which includes:
   a plurality of spaced supports for supporting a workpiece to be cut,
   a slag receiving member beneath said supports,
   a slag collecting member adjacent to said receiving member for receiving slag from said receiving member, and
   liquid supply means for delivery of liquid to and over said slag receiving member thereby to impel slag to said collecting member,
   said supports including replaceable portions and
   including supporting members carried on said slag receiving member.

2. Apparatus for removing metallic slag from torch cutting operations as defined in claim 1 in which said slag receiving member includes an inclined plate.

3. Apparatus for removing metallic slag from torch cutting operations as defined in claim 2 in which said supports include wedge plates.

4. Apparatus for removing metallic slag from torch cutting operations on metallic sheet material which includes:
- a plurality of spaced supports for supporting a workpiece to be cut,
- a slag receiving member beneath said supports,
- a slag collecting member adjacent to said receiving member for receiving slag from said receiving member, and
- liquid supply means for delivery of liquid to and over said slag receiving member thereby to impel slag to said collecting member,
- said collecting member including a conveyor, and
- said liquid supplying means including a pump connected to said tank delivering liquid to said slag receiving member at a plurality of locations.

5. Apparatus for removing metallic slag from torch cutting operations as defined in claim 4 in which:
- a slag container is provided outside said tank, and
- said slag collecting conveyor is mounted for delivering slag to said slag container.

References Cited

UNITED STATES PATENTS

| | | | |
|---|---|---|---|
| 2,859,023 | 11/1958 | Bucci | 263—45 X |
| 3,163,559 | 12/1964 | Thompson et al. | 266—23 X |

JOHN J. CAMBY, Primary Examiner

U.S. Cl. X.R.

266—23